United States Patent [19]

Nolte et al.

[11] 4,348,990
[45] Sep. 14, 1982

[54] APPARATUS FOR REGULATING THE ROTATION OF A HYDRAULICALLY-OPERATED COOLING FAN

[75] Inventors: Albert Nolte, Cologne; Herbert Schleiermacher, Brühl; Erich Arbeiter, Plochingen, all of Fed. Rep. of Germany

[73] Assignee: Klöckner-Humboldt-Deutz Aktiengesellschaft, Cologne, Fed. Rep. of Germany

[21] Appl. No.: 211,451

[22] Filed: Nov. 28, 1980

Related U.S. Application Data

[63] Continuation-in-part of Ser. No. 190,654, Sep. 25, 1980.

[51] Int. Cl.³ .................................................. F01D 1/00
[52] U.S. Cl. ............................. 123/41.12; 123/41.65; 192/82 T
[58] Field of Search ............... 123/41.11, 41.12, 41.56, 123/41.55, 41.63, 41.65, 41.66; 192/82 T; 236/35, 86

[56] References Cited

U.S. PATENT DOCUMENTS

| | | | |
|---|---|---|---|
| 2,854,964 | 10/1958 | Wagner | 123/340 X |
| 4,065,052 | 12/1977 | Ridenour | 123/41.12 X |
| 4,124,001 | 11/1978 | Samuel et al. | 236/35 |
| 4,132,199 | 1/1979 | Kuroiwa et al. | 123/440 |
| 4,223,654 | 9/1980 | Wessel et al. | 123/340 X |
| 4,325,330 | 4/1982 | Kugler et al. | 123/41.12 |

FOREIGN PATENT DOCUMENTS 1170194 11/1964 Fed. Rep. of Germany .
844009 8/1960 United Kingdom ............. 123/41.12

Primary Examiner—William A. Cuchlinski, Jr.
Attorney, Agent, or Firm—Watson, Cole, Grindle & Watson

[57] ABSTRACT

A regulation apparatus for determining the flow of fluid to a hyraulically-operated cooling fan of an air-cooled internal combustion engine includes an electromagnetic valve connected in the fluid line to the cooling fan, a control unit which sends a signal to the electromagnetic valve to control its operation, and multiple sensor elements which are positioned in or near the engine to detect the various parameters which affect its operation, the sensor elements sending electrical input signals to the control unit.

5 Claims, 6 Drawing Figures

APPARATUS FOR REGULATING THE ROTATION OF A HYDRAULICALLY-OPERATED COOLING FAN

CROSS REFERENCE TO RELATED APPLICATION

The present application is a continuation-in-part application of application Ser. No. 190,654, filed Sept. 25, 1980.

BACKGROUND OF THE INVENTION

1. Field of the Invention

The present invention relates to internal combustion engines, and more specifically to air-cooled internal combustion engines having hydraulically-operated cooling fans, these engines including hydraulic lines for conveying fluid to the cooling fans in which are located flow control valves.

2. The Prior Art

Air-cooled internal combustion engines which are cooled by hydraulically-operated cooling fans that are operated by the passage of fluids through their hydraulic couplings are well known. In many engines of this type the cooling fan will be operated by the flow of engine lubricating oil therethrough, and these engines will include hydraulic lines for circulating the engine lubricating oil pumped from the oil pan to the hydraulic coupling of the cooling fan. Such hydraulic lines will have valves therein to control the flow of the lubricating oil therethrough and thus determine the speed of rotation of the cooling fans. The operation of these valves will often be controlled by an elastic temperature gauge which will be positioned to detect the temperature of a structural part of the engine, or else by a temperature gauge which will be positioned to detect the temperature of the engine exhaust gas.

Such prior art engines have not been known to utilize more than two temperature gauges to control the operation of the value in the hydraulic line.

Tests by the present inventors have shown, however, that both the fuel consumption of the engine and the sound emissions therefrom can be reduced if the rotational speed of the cooling fan can be continuously optimized with respect to not only the temperature of a structural part of the engine and the temperature of the engine exhaust gas, but if the cooling fan's rotational rate can take into consideration the temperature of the lubricating oil, the air temperature of the surrounding atmosphere and the air pressure of the surrounding atmosphere, i.e., since all of these parameters have been found to affect the operation of the engine.

It is thus an object of the present invention to provide a regulation apparatus which can control the flow of fluid to a hydraulically-operated cooling fan in an air-cooled internal combustion engine based on the relevant parameters which have been found to affect its operational characteristics.

SUMMARY OF THE INVENTION

According to the present invention, the regulation apparatus of the invention includes an electromagnetic valve which is positioned in the hydraulic fluid line of an air-cooled internal combustion engine which conveys the operating fluid to the hydraulically-operated cooling fan, a control unit which sends electrical control signals to the electromagnetic valve to control whether it will be open or closed to the flow of hydraulic fluid therethrough, and a multiplicity of sensor elements which are located in and near the internal combustion engine to measure the required parameters, the sensor elements simultaneously sending electrical input signals to the control unit.

The electromagnetic valve will preferably be a 2/2-way valve which will function to be in either an open or a closed position, and the control unit will preferably be constructed to emit electrical control signals which will have a periodically shifting two-point controlling voltage. The 2/2-way valve may be of the hydraulically undampened type or of the hydraulically dampened type (dampening in both directions of movement).

In the preferred embodiment of the invention the electromagnetic valve will be located in a hydraulic line to the engine which will be connected to convey engine lubricating oil from the engine oil pan to the hydraulic coupling of the cooling fan.

One advantage to using the inventive regulation apparatus as the means for controlling the flow of fluid through the hydraulic line conveying the operating fluid to the hydraulically-operated cooling fan resides in the fact that the control unit which acts to control the electromagnetic valve thereof can be located at a remote location from the valve since the electrical line connected therebetween can be any desired length, such that the control box can be disposed at a location outside the engine space. In this way it can be removed from the large temperature variations which occur in the engine space (especially in trucks) and can be protected from exposure to contamination by road particles and dust projected therein.

In addition, the inventive regulation apparatus uses electromagnetic valves which are commercially available, thus reducing its cost. The noted control unit can be engineered to achieve any desired rate of revolution for the cooling fan, based on the type of control signal sent to the valve.

At the same time, it has been found that no detrimental effects are produced in the hydraulic lines in which the electromagnetic valves of the inventive regulation apparatus are located, even when the electromagnetic valves used are the type which produce pulsating fluid flows therethrough.

Further features and advantages of the present invention will be had from a review of the attached drawings taken in conjunction with the following discussion.

DETAILED DESCRIPTION OF THE PREFERRED EMBODIMENT

Figure 1:
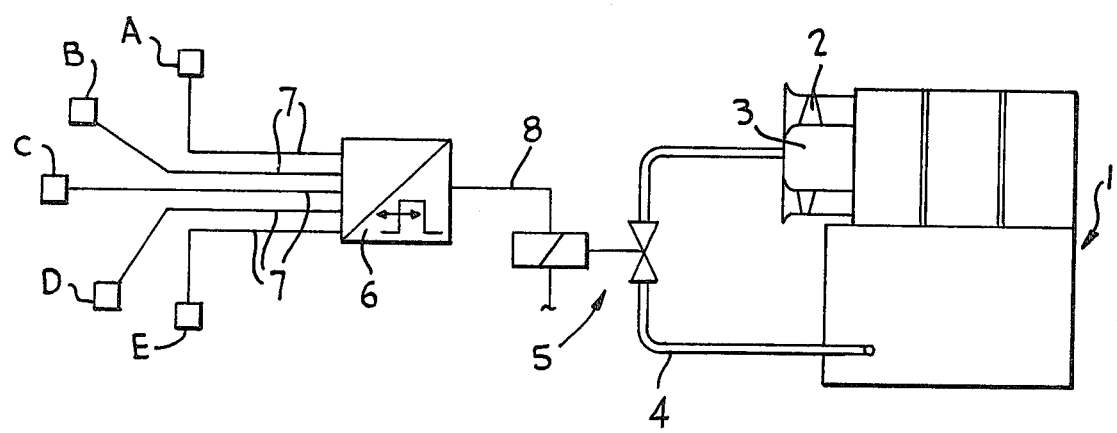
FIG. 1 show a schematic representation of a regulation apparatus in accordance with the present invention.

The essential parts of the inventive regulation apparatus are shown schematically in FIG. 1. These parts include an electromagnetic valve 5, a control unit 6 and multiple sensor elements, such as elements A, B, C, D and E, the sensor elements being electrically connected to the control unit 6 by electrical conductors 7 and the control unit 6 being electrically connected to the valve 5 by an electrical line 8.

Figure 1A:
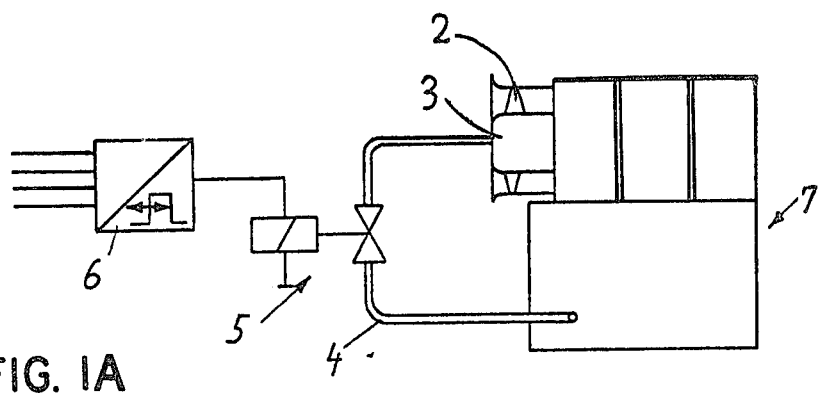
FIG. 1A shows in schematic form an air-cooled internal combustion engine which includes a hydraulically-operated cooling fan, the cooling fan being operated by the flow of engine lubricating oil through a hydraulic line, the flow therethrough being regulated by the regulation apparatus of FIG. 1.

In FIG. 1A an air-cooled internal combustion engine 1 is shown which includes a hydraulically-operated cooling fan 2 having a hydraulic coupling 3, the operating fluid for the cooling fan comprising engine lubricating oil. This oil is pumped from the oil pan located at the bottom of engine 1 to the hydraulic coupling 3 of the cooling fan 2 by a hydraulic line 4 (the conduits for return of the oil to the oil pan from the cooling fan 2 not being shown). The inventive regulation apparatus is connected to the hydraulic line 4 to continuously regulate the flow of oil therethrough and thus the rotational speed of the cooling fan 2 (and thus the achieved cooling effect of cooling fan 2 of engine 1).

More specifically, the electromagnetic valve 5 of the inventive regulation apparatus is connected along the length of hydraulic line 4, this valve comprising, for example, a hydraulically undampened 2/2-way valve which will operate to be either opened or closed, i.e., depending on the characteristics of the electrical control signal fed thereto from the control unit 6. It should be noted that this valve will remain in an open position if no electrical control signal is fed thereto, thus allowing lubricating oil to flow through hydraulic line 4 and operate cooling fan 2 in the event of an electrical breakdown in the other parts of the regulation apparatus.

The control unit 6, which is constructed to act as a value-processing device, sends an electrical control signal to the electromagnetic valve 5 derived from computations made therein based on the electrical input signals conveyed thereto from the various sensor elements, e.g., elements A, B, C, D and E, over the electrical conductors 7 which are positioned at the desired locations on or near the engine. For example, one sensor element will comprise a temperature gauge attached to a structural part of the engine which will have its temperature affected by the operational characteristics (i.e., speed) of the engine so as to detect its temperature, another sensor element will comprise a temperature gauge suitably positioned to detect the temperature of the engine exhaust gases, another sensor element may comprise a temperature gauge suitably positioned to detect the temperature of the engine lubricating oil, another sensor may comprise a temperature gauge suitably positioned to detect the temperature of the surrounding atmosphere, and another sensor element may comprise a pressure gauge suitably positioned to detect the pressure of the surrounding atmosphere.

Thus, the electrical control signal passing from the control unit 6 to the valve 5 will cause the valve to be either opened or closed, the thus controlled amount of engine lubricating oil flowing therethrough per unit of time causing the cooling fan to rotate at the optimum speed necessary to cool the engine in accordance with its prevailing parameters of operation, including the surrounding atmospheric temperature and pressure.

Figure 3:
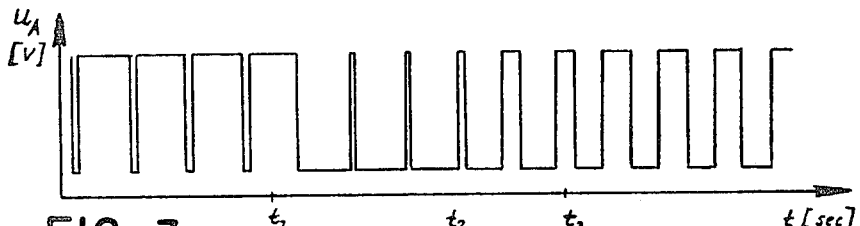
FIG. 3 shows a graph of the changing characteristics of a representative voltage profile of the electrical control signal which will pass from the control unit of the inventive regulation apparatus shown in FIG. 1 to the valve thereof when one of the sensor elements thereof is connected to the structural part of the internal combustion engine undergoing the temperature changes shown in FIG. 2 and the remaining control unit receives unchanging electrical input signals from the other sensor elements electrically connected thereto.

FIG. 3 shows the temperature profile over time of a structural part of the engine which will have its temperature affected by the operational characteristics of the engine, this structural part being one to which a temperature gauge of the inventive regulation apparatus is attached. It can be seen that prior to time $t_1$ when the engine is operating under constant conditions (e.g. at a constant speed), the temperature of the engine part which is being measured by the temperature gauge will remain constant at $T_1$. This value will be conveyed in the form of an electrical input signal to the control unit 6.

During this same time period the control unit 6 will send a suitable electrical control signal through electrical line 8 to valve 5, this electrical control signal preferably having a voltage which oscillates as shown in FIG. 3 (the electrical control signal voltage graph in FIG. 3 assumes a constancy of electrical signals from the other sensor elements sent to the control unit 6).

This electrical control signal will have a varying voltage which will oscillate from a maximum value to a minimum value, the maximum value acting to cause the value 5 to close and the minimum value acting to cause the valve 5 to open. It can be seen that during this time period prior to $t_1$, the voltage will be at its maximum value much longer than at its minimum value; thus, with this electrical control signal, the valve 5 will be closed for much longer periods than it will be open. When the valve 5 is a hydraulically undampened 2/2-way valve, the oil will pass therethrough along hydraulic line 4 in a pulsating fashion, and the cooling fan 2 will likewise be caused to rotate in a pulsating fashion as is shown in FIG. 4.

Figure 2:
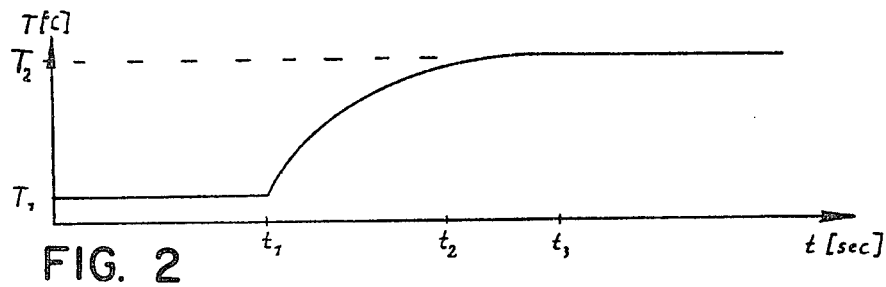
FIG. 2 depicts a typical temperature profile over time of a structural part of the internal combustion engine which will have its temperature affected by the operational characteristics of the engine, the engine operating such that the structural part will heat up during a time period between $t_1$ and $t_3$.

At time $t_1$ the engine operational characteristics are caused to change (e.g. the engine speeded up) such that the engine structural part being measured for its temperature will heat up from $T_1$ to $T_2$ over the time period from $t_1$ to $t_3$ as indicated in FIG. 2, the rate of temperature increase being less between time $t_2$ to $t_3$ than between $t_1$ to $t_2$. In response to this, the electrical control signal sent from the control unit 6 to the valve 5 will be changed in characteristics as shown in FIG. 3, the relative duration of the voltage at its minimum value being increased drastically with respect to the duration at its maximum value in the time period $t_1$ to $t_2$, with the relative duration then decreasing somewhat in the time period $t_2$ and $t_3$. Thus, starting at time $t_1$ the hydraulically undampened electro-magnetic valve 5 will be open for much longer periods (and the cooling fan will, as shown in FIG. 4, begin rotating first continuously and then at a greatly increasing overall rate, and by time $t_2$ will be open for somewhat shorter periods, such the rate of increase in the overall rotational rate of the cooling fan will slow down).

Once the engine has reached its new operational characteristics (e.g. a new, higher speed) and the temperature of the engine structural part reaches a steady $T_2$, the relative duration of the voltage at its minimum value to its maximum value will achieve a new constant ratio which will be somewhat less than that when the engine structural part's temperature was increasing. The cooling fan 2 will thus rotate at a rate indicated in FIG. 4. In this way the cooling fan 2 can be caused to rotate at a rate so as to cool the engine exactly as necessary based on the various parameters which have been found to affect its operation.

Figure 4:
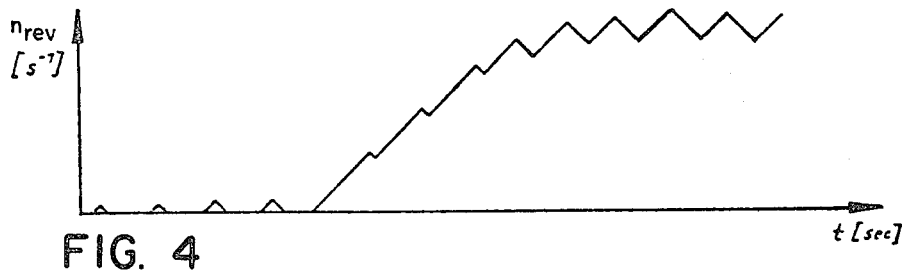
FIG. 4 shows a graph of the number of revolutions per second of the cooling fan of the internal combustion engine of FIG. 2 when the valve of the invention regulation apparatus is a 2/2-way valve which is hydraulically undampened and which is controlled by the electrical control signal shown in FIG. 3.
Figure 5:
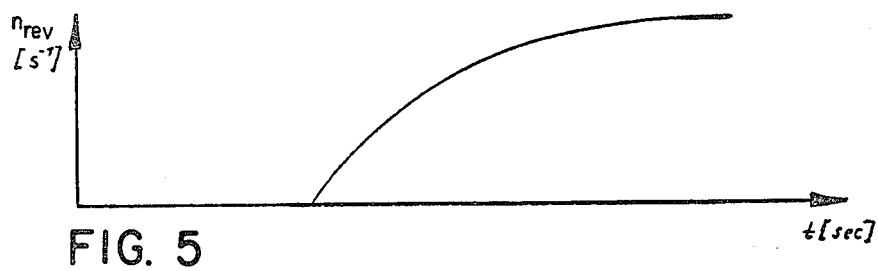
FIG. 5 depicts the number of revolutions per second of the cooling fan of the internal combustion engine of FIG. 2 when the valve of the inventive regulation apparatus is a 2/2-way valve which is hydraulically dampened during both its opening and closing actions and the valve controlled by the electrical control signal shown in FIG. 3.

When it is desired that the cooling fan be rotated in a more continuous fashion, i.e., without the pulsations indicated in FIG. 4, the valve 5 can be a 2/2-way valve which is hydraulically dampened during both its opening and closing actions. Such a valve will act more sluggishly to the characteristics of the electrical control signal from control unit 6, and using such a valve in place of the 2/2-way undampened valve which produces the cooling fan operation shown in FIG. 3, will produce the operation according to FIG. 4.

In another embodiment of the invention, the control unit 6 can be constructed such that the cycle frequency of the electrical control signal emanating therefrom is changed, i.e., the period of time between voltage oscillations adjusted. In this regard, if the control unit 6 is caused to emit an electrical control signal having a high enough frequency, the valve 5 will in fact be caused to assume a partially open state, i.e., since it will be unable to open and close fast enough in response to the rapidly oscillating voltage impulses.

While certain embodiments of the invention have been shown in the drawings and described above, it should be appreciated that many changes therein can be made and still fall within the scope of the invention as defined in the appended claims.

We claim:

1. In an air-cooled internal combustion engine which includes a hydraulically-operated cooling fan and a hydraulic line circulating fluid to said hydraulically-operated cooling fan to operate said cooling fan, the improvement wherein a regulation apparatus is utilized to control the flow of fluid through said hydraulic line, said regulation apparatus including an electromagnetic valve connected to said hydraulic line to control the flow of fluid therethrough, a control unit electrically connected to said electromagnetic valve so as to send an electrical control signal thereto which has a voltage which oscillates from a maximum value to a minimum value, and said control unit being capable of controlling the characteristics of said electrical control signal such that the ratio of time periods during which the voltage thereof is at its maximum value and at its minimum value is changeable, a multiplicity of sensor elements electrically connected to said control unit, said sensor elements being positioned to detect various operational parameters which affect the operation of said engine, the electrical signals from said sensor elements being sent to said control unit to enable said control unit to control the electromagnetic valve to operate such that the amount of fluid passing therethrough will be continuously controlled, the speed of rotation of said cooling fan thus always being maintained at the optimum rate for cooling the engine.

2. The internal combustion engine as claimed in claim 1 wherein said electromagnetic valve is a 2/2-way valve which is hydraulically undampened and which will be shut when the voltage of the electrical control signal is at its maximum value and open when the voltage of the electrical control signal is at its minimum value.

3. The internal combustion engine as claimed in claim 1 wherein said electromagnetic valve is a 2/2-way valve which is hydraulically dampened during both its opening and closing actions.

4. The internal combustion engine as claimed in claim 1 wherein at least one of said sensor elements is a temperature sensor.

5. The internal combustion engine as claimed in claim 1 wherein five sensor elements are electrically connected to said control unit, one sensor element comprising a temperature gauge attachable to a structural part of the engine to detect the temperature thereof, one sensor element comprising a temperature gauge positionable to detect the temperature of the engine exhaust gases, one sensor element comprising a temperature gauge positionable to detect the temperature of the engine lubricating oil, one sensor element comprising a temperature gauge positionable to detect the temperature of the surrounding atmosphere, and one sensor element comprising a pressure gauge positionable to detect the pressure of the surrounding atmosphere.

* * * * *

UNITED STATES PATENT OFFICE
CERTIFICATE OF CORRECTION

PATENT NO. : 4,348,990

DATED : September 14, 1982

INVENTOR(S) : Albert Nolte et al

It is certified that error appears in the above-identified patent and that said Letters Patent are hereby corrected as shown below:

On the title page:

[30] FOREIGN APPLICATION PRIORITY DATA

September 25, 1979    Germany.......... 29 38 706

Signed and Sealed this

Twenty-fifth Day of January 1983

[SEAL]

Attest:

Attesting Officer

GERALD J. MOSSINGHOFF

Commissioner of Patents and Trademarks